April 30, 1929.  R. PERCZIAN  1,711,247
WATERLESS EGG COOKER
Filed Feb. 19, 1925
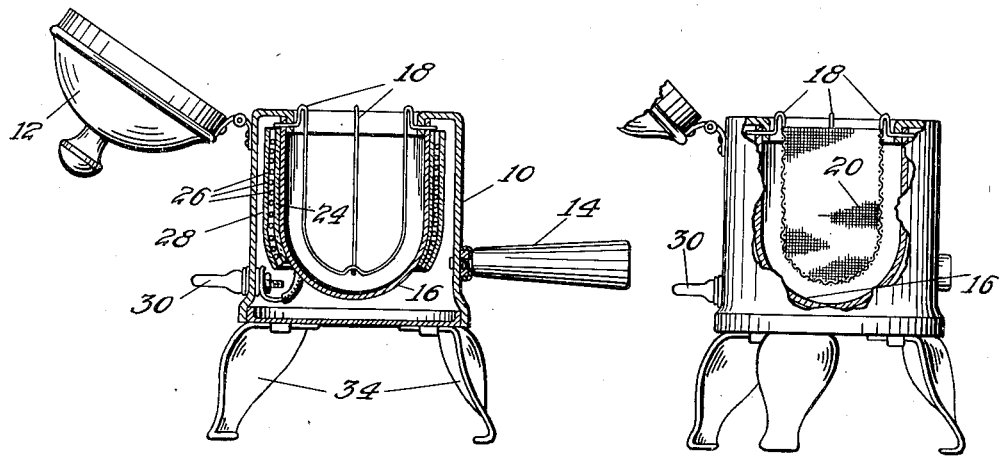
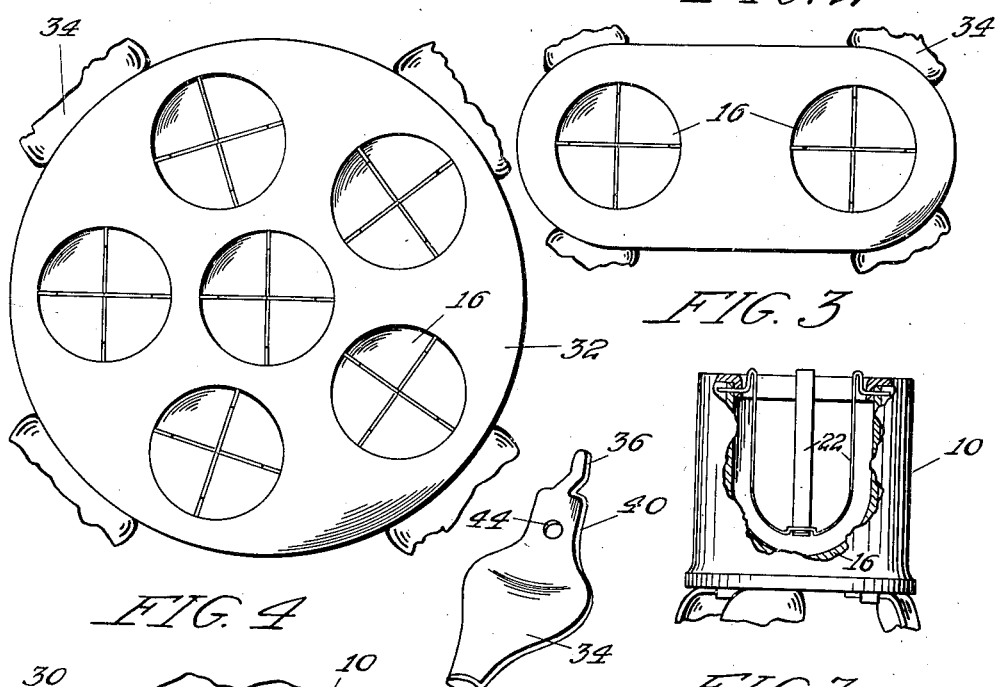
RUDOLPH PERCZIAN
INVENTOR
PER
Albert J. Fihe
ATTORNEY Patented Apr. 30, 1929.

1,711,247

UNITED STATES PATENT OFFICE.

RUDOLPH PERCZIAN, OF CHICAGO, ILLINOIS.

WATERLESS EGG COOKER.

Application filed February 19, 1925. Serial No. 10,236.

This invention relates to improvements in waterless egg cookers and has for one of its principal objects the provision of means whereby an egg or similar article of food can be conveniently and readily cooked and rendered edible and tasty without the use of water or any other similar medium.

One of the important objects of this invention is to provide an egg cooker or the like heated by electricity, which will cook an egg or similar object without the use of water, and within a shorter space of time than that ordinarily required for boiling an egg.

Another and further important object of this invention is to provide a cooker for eggs or the like which will render possible the utilizing and satisfactory cooking for food purposes of cracked and broken eggs which would ordinarily not be suitable, particularly for boiling.

Still another and further important object of this invention is the provision, in an egg cooker, of a removable handle and legs of such dimensions that when removed they can be readily carried in the interior of the cooker, thereby forming a package adapted for convenient and economical shipping and packing for transportation.

Other and further important objects of the invention will be apparent from the disclosures in the accompanying drawing and following specification.

The invention, in a preferred form, is illustrated in the drawings and hereinafter more fully described.

In the drawings:

Figure 1 is a vertical view, partly in section, of the improved egg cooker of this invention.

Figure 2 is a similar view illustrating a slight modification.

Figure 3 is a top plan view, with the cover removed, of a double cooker.

Figure 4 is a top plan view, with the cover removed, of a cooker for six eggs.

Figure 5 is a perspective view of one of the improved removable legs adapted to be applied to the cooker.

Figure 6 is a partial bottom view of the improved cooker, illustrating the method of application of the removable leg or support.

Figure 7 is a vertical elevation, parts being broken away, illustrating still another modification of the invention.

As shown in the drawings:

The reference numeral 10 indicates generally the casing of the improved waterless egg cooker of this invention, having a hinged cover 12 thereon and a removable operating handle 14.

As is best shown in Figures 1, 2, and 7, the top portion of the casing 10 is bent inwardly and thence downwardly to form a circular opening with overhanging edges, in the rear of which edges is fitted the upper edge of an egg receptacle 16, and the related parts of the corresponding overhanging flange of the casing 10, and into these corresponding openings are fitted the ends of bent-over wires or rods 18, as best illustrated in Figures 1 and 2, whereby the egg receptacle 16 is securely maintained in desired position.

The wires or rods 18 extend downwardly into the egg cup 16 and follow the contour thereof, being spaced away from the interior surface so as to support the egg in position to avoid direct contact with the heated interior surface of the cup or receptacle 16. As illustrated in Figure 2, the supporting wires 18 may, if desired, be replaced by netting or wire mesh 20, or, as shown in Figure 7, the wires may be replaced by strips 22, the ends of which, in turn, operating through corresponding slits to retain the egg receptacle 16 in desired position in the casing 10.

As best shown in Figure 1, the outer sides of the receptacle 16 are overlaid with a protective covering 24 of mica or other suitable electrical insulating material, upon which, in turn, is laid a number of turns of a heating element 26 in the form of the usual current-carrying wire or resistance element, and overlying the spaced turns of wire and suitably insulating the same from short-circuits and also from accidental contact with other objects, is an outer layer of asbestos 28 or some other suitable material, properly cemented into position. Proper connecting leads 30 are provided for the ends of the wires and are suitably insulated from that portion of the casing 10 through which they pass.

As shown in Figure 3, the casing 10 may be enlarged to include two egg receptacles 16, heated and insulated from each other in the same manner as above described, and larger receptacles, such as illustrated at 32 in Figure 4, may be provided adapted to contain six or more egg cups 16 in which a plurality of eggs may be cooked at one operation.

As best illustrated at 34 in Figures 5 and 6, removable legs or supports are provided for the casings 10, 32, etc., each support provided with an integral tongue 36, adapted to be fitted into an opening 38 in the bottom of the casing 10, as best illustrated in Figure 6, and adjacent the tongue 36 is a flattened portion 40 adapted to be inserted under an integral projecting tongue or the like 42 struck from the bottom of the casing 10. A depression or opening 44 is punched into the member 40 of the foot 34, and a corresponding circular lug 46 is formed integral with the tongue 42, which, when the foot 34 is in proper position, will be spring pressed into the depression or opening 44, thereby retaining the support or leg securely in proper position.

It will be evident that herein is provided a simple, economical and effective means for cooking eggs or the like, which positively eliminates the necessity of water or any other cooking medium and will provide a palatable article of food in a space of time ordinarily much less than that required to boil or otherwise prepare an egg. Further, the operating handle 14 and the supporting legs 34 can be readily and conveniently removed and placed inside the receptacle for purposes of storage, shipping, or transportation.

I am aware that many changes may be made and numerous details of construction varied throughout a wide range without departing from the principles of this invention, and I therefore do not purpose limiting the patent granted hereon otherwise than as necessitated by the prior art.

I claim as my invention:

1. A waterless egg cooker comprising a casing, a cup within the casing having a heating element on the outside thereof, and a frame of crossed rods of the general contour of the inside of the cup and spaced therefrom, said crossed rods serving to support an egg thereon during the process of cooking, and serving to connect the cup to the casing.

2. In an egg cooker, a casing having an apertured top with a continuous depending flange, a cup having a heating element on the outside thereof, and an egg supporting member including a plurality of rods disposed within the cup and spaced from the inside walls thereof, the ends of said rods extending through said depending flange and through the cup and serving to hold said cup in position with respect to the casing.

In testimony whereof I affix my signature.

RUDOLPH PERCZIAN.